United States Patent [19]
Le Vine

[11] 3,906,473
[45] Sept. 16, 1975

[54] METHOD AND APPARATUS FOR OPERATING A GAS SENSOR

[75] Inventor: Harris D. Le Vine, Albany, N.Y.

[73] Assignee: Will Ross, Inc., Glendale, Wis.

[22] Filed: Mar. 8, 1974

[21] Appl. No.: 449,474

[52] U.S. Cl. .......................... 340/237 R; 23/255 E
[51] Int. Cl.² ........................................ G08B 21/00
[58] Field of Search ... 340/237 R; 23/232 E, 254 E, 23/255 E, 254 R, 253; 73/27 R

[56] References Cited
UNITED STATES PATENTS
2,904,406  9/1959  Moore ........................... 23/254 E X

*Primary Examiner*—John W. Caldwell
*Assistant Examiner*—Daniel Myer
*Attorney, Agent, or Firm*—Dorfman, Herrell and Skillman

[57] ABSTRACT

A gas sensor of the type which responds to contacting by carbon monoxide preferentially when operated in a lower temperature range to reduce its electrical resistance, and which is much less responsive to contacting by carbon monoxide when operated in a higher temperature range, is operated alternately and repetitively in the lower temperature range and in the higher temperature range. Operation in the higher temperature range purges the sensor of the carbon monoxide, and operation in the lower temperature range produces signals representative of the concentration of CO contacting the sensor. The current passed by the sensor represents the resistance of the sensor and is sampled during intervals when the sensor is in its lower temperature range to derive signal samples representing the concentration of carbon monoxide; a hold circuit converts these samples to a continuous signal varying in accordance with the concentration of carbon monoxide. A threshold circuit senses when this continuous signal rises above a predetermined safe level and operates an alarm at such time.

13 Claims, 11 Drawing Figures

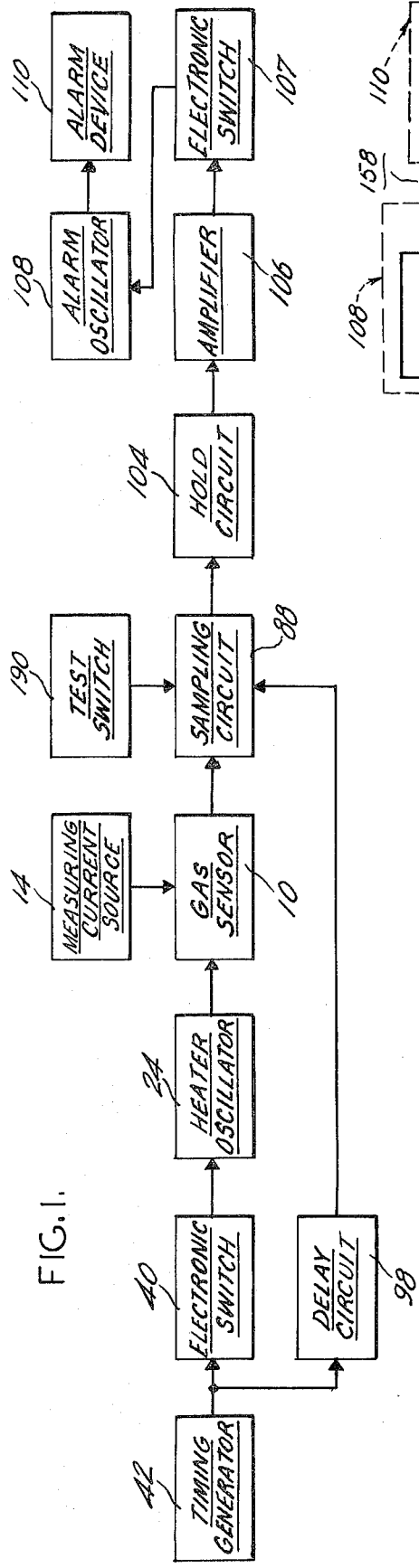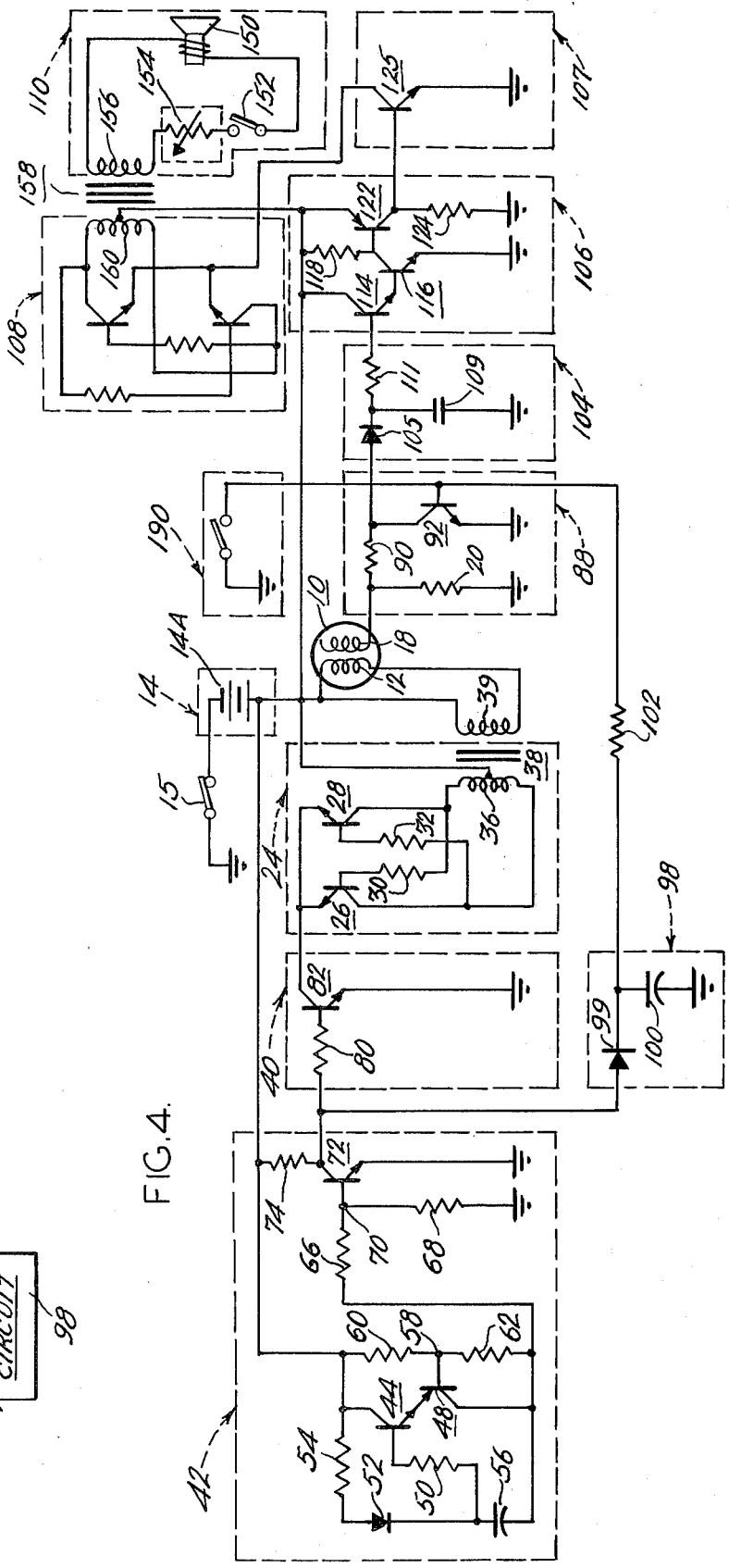
FIG.1.
FIG.4.

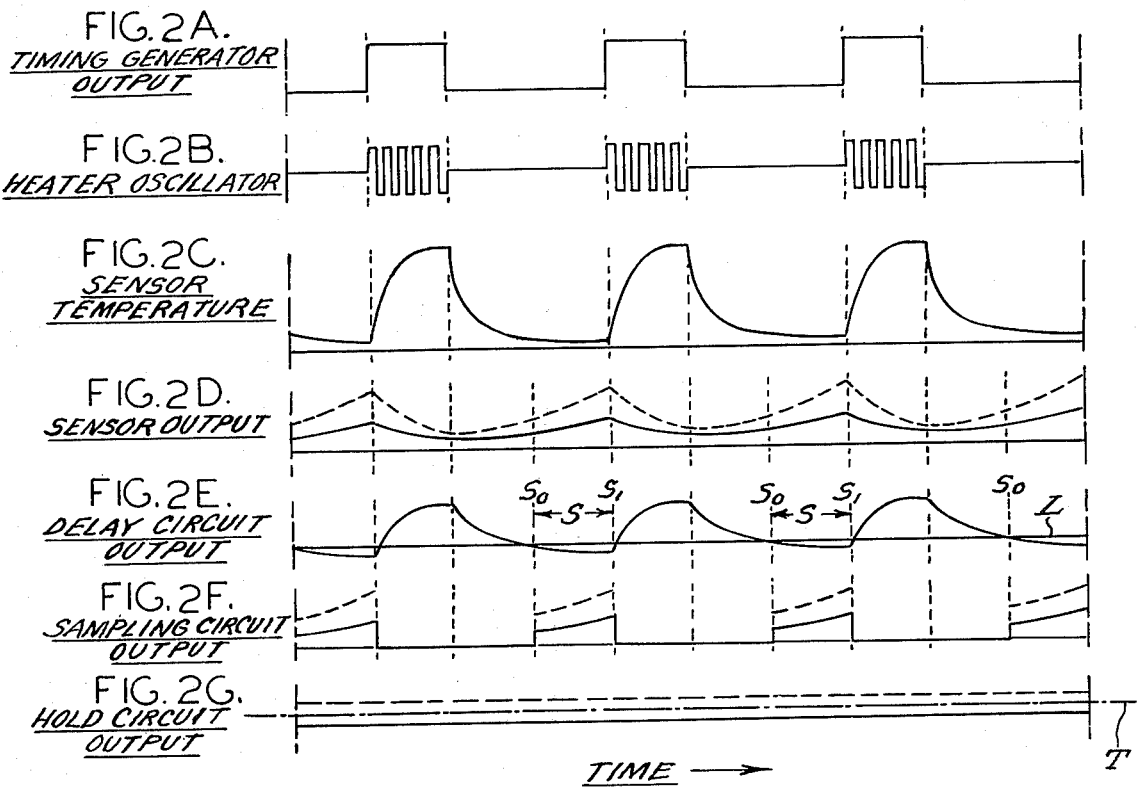
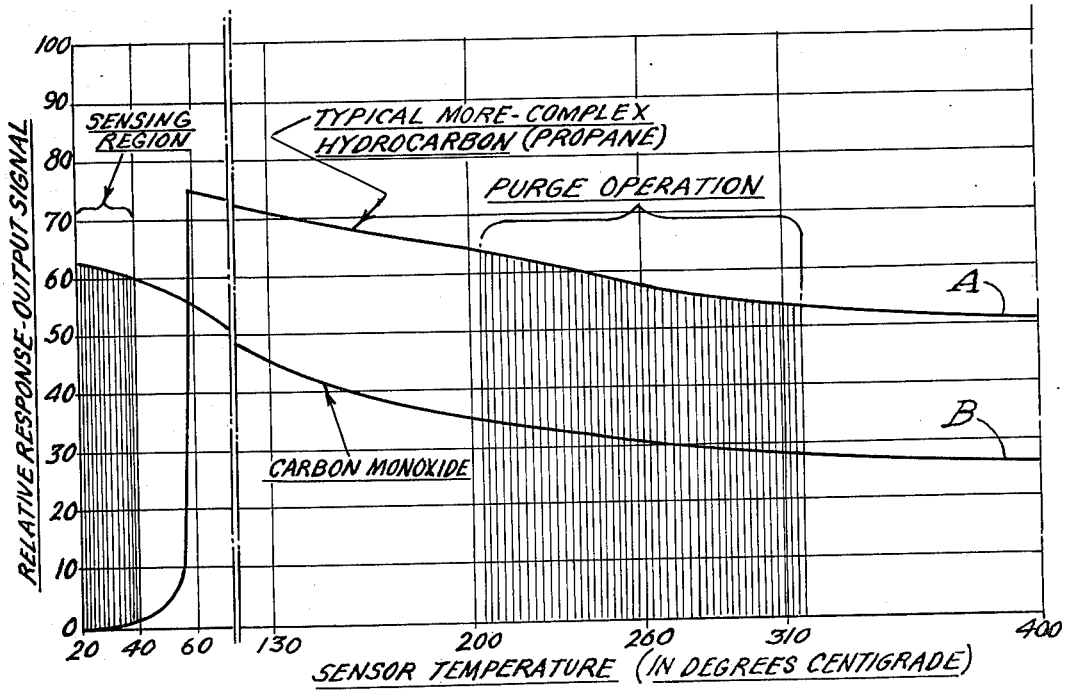

METHOD AND APPARATUS FOR OPERATING A GAS SENSOR

BACKGROUND OF THE INVENTION

There are many applications when which it is desired to be able to sense the level of certain gases in the air. One particular use for such apparatus is in detecting the level of harmful or poisonous gases in the air. For example, carbon monoxide accumulating in excess quantities in a building or vehicle may seriously or completely impair the ability of a person to operate in that environment, or may even result in death. A dangerous situation can also arise with respect to methane gas, which can produce severe danger of explosion or fire.

Many types of gas detectors for detecting the presence of gases are known in the prior art. One such known type of device utilizes a gas sensor employing a type IV oxide compound which when exposed to oxygen at high temperature absorbs oxygen into the crystalline molecular matrix by adsorption. The absorbed oxygen acts as an electron acceptor and reduces the electrical conductivity of the oxide. When gases such as carbon monoxide, methane, propane, butane or other reducing gases contact the surface of the detector, they are absorbed and act as electron donors so as to reduce the resistance of the oxide body. As a result, the electric current flowing through the oxide body in response to a voltage supplied to it will increase above an initial stable "zero" current when the body is contacted by such reducing gases. When the oxide sensor is operated at a sufficiently high temperature, the airborne oxygen is absorbed into the sensor until an equilibrium is reached, producing a fixed equilibrium value of resistance. This equilibrium will be a measure of the concentration of the contacting reducing gases. If the reducing gas is only transitorily in contact with the sensor oxide, heating of the sensor to a very high temperature in the oxygen atmosphere will "purge" the sensor and return it to its full high resistance state. One commercially available form of such a gas sensor is known as the Taguchi Gas Sensor, made by the Figaro Engineering Company, Inc. of Osaka, Japan, for example, as disclosed in U.S. Pat. No. 3,676,820.

One difficulty with such an equilibrium type of measurement of gases is that, with the sensor operating in such a high temperature range, its response to carbon monoxide and methane is substantially lower than for other more complex hydrocarbon molecule gases. Furthermore, the sensitivity of the equilibrium method is less than is desirable for some purposes.

It has been found that for such sensors there is a lower temperature range of operation for which the carbon monoxide and methane response of the sensor becomes higher, and the response to other more complex hydrocarbons becomes very much less. However, at such lower temperatures the above-mentioned reabsorption of oxygen does not occur to any substantial degree, and if the sensor is continuously contacted with even a very small amount of carbon monoxide for example, the carbon monoxide will accumulate until the sensor is saturated. This will cause the sensor to produce large output indications even when extremely small and safe levels of carbon monoxide are present for a substantial time, and, when the saturation condition exists, no useful further reading of carbon monoxide will be obtained.

SUMMARY OF THE INVENTION

In accordance with the invention there is provided a method and apparatus employing a gas sensor of the type which exhibits substantial response to contact by a given class of gases when the temperature of the sensor is in a lower range and which purges itself of said gases when operated in a temperature range higher than said lower range; the sensor is operated alternately and repetitively in said lower temperature range to sense the presence of said gases and in said higher temperature range to purge the sensor of said gases, and the response of the sensor while operating in the lower temperature range is sampled and indications produced of the sensor response during these sampled lower temperature intervals.

The gas sensor is preferably of the class which responds more strongly to contact by CO or methane when operated in the lower temperature range than when operated in the higher temperature range, and is preferably of a known type in which the response of the sensor is greater to CO or methane than to more complex hydrocarbon gases when operated in the lower temperature range, but is less than the response to such other complex hydrocarbons when operated in the higher temperature range. The sensor is preferably also of the type which becomes less conductive when it absorbs oxygen, and which absorbs oxygen more readily when operated in the higher temperature range than when operated in the lower temperature range.

Since the sensor is very sensitive to CO or methane when operated in the lower temperature range, the samples of the response of the sensor taken during low temperature operation accurately and sensitively represent the amount of CO or methane present; the alternate operations in the high temperature range produce purging to prevent saturation of the sensor.

In a preferred form of the apparatus of the invention, the alternate heating and cooling of the sensor is produced by a heater oscillator turned on and off intermittently by a periodic timing generator, and the resistance of the sensor is measured by passing a current through it. The timing generator also controls the times of sampling, and a hold circuit is used to hold the sampled signals and convert them to a continuous signal. A threshold circuit senses when the continuous signal achieves a certain predetermined level, for example a level for which the concentration of CO or methane becomes dangerous, and operates an alarm in response thereto. Also in a preferred embodiment the heating is accomplished by superimposing an alternating heating voltage onto a direct resistance-measuring voltage, and test switch means are employed which are manually operable to discontinue the interrupting of the sensor output signal normally used to effect sampling and permitting the entire output of the sensor to be applied continuously to the remainder of the circuit as a test operation.

BRIEF DESCRIPTION OF FIGURES

The various objects, features, embodiments and operation of the invention will be more readily understood from a consideration of the following detailed description, taken in connection with the accompanying drawings, in which:

FIG. 1 is a block diagram of one preferred specific embodiment of the invention;

FIG. 2A through 2G are graphical representations illustrating the operation of that preferred embodiment;

FIG. 3 is a graphical representation to which reference will be made in describing the operation of the invention;

FIG. 4 is a more detailed electrical schematic diagram of a preferred embodiment of FIG. 1.

DETAILED DESCRIPTION OF SPECIFIC EMBODIMENTS

Figure 5:
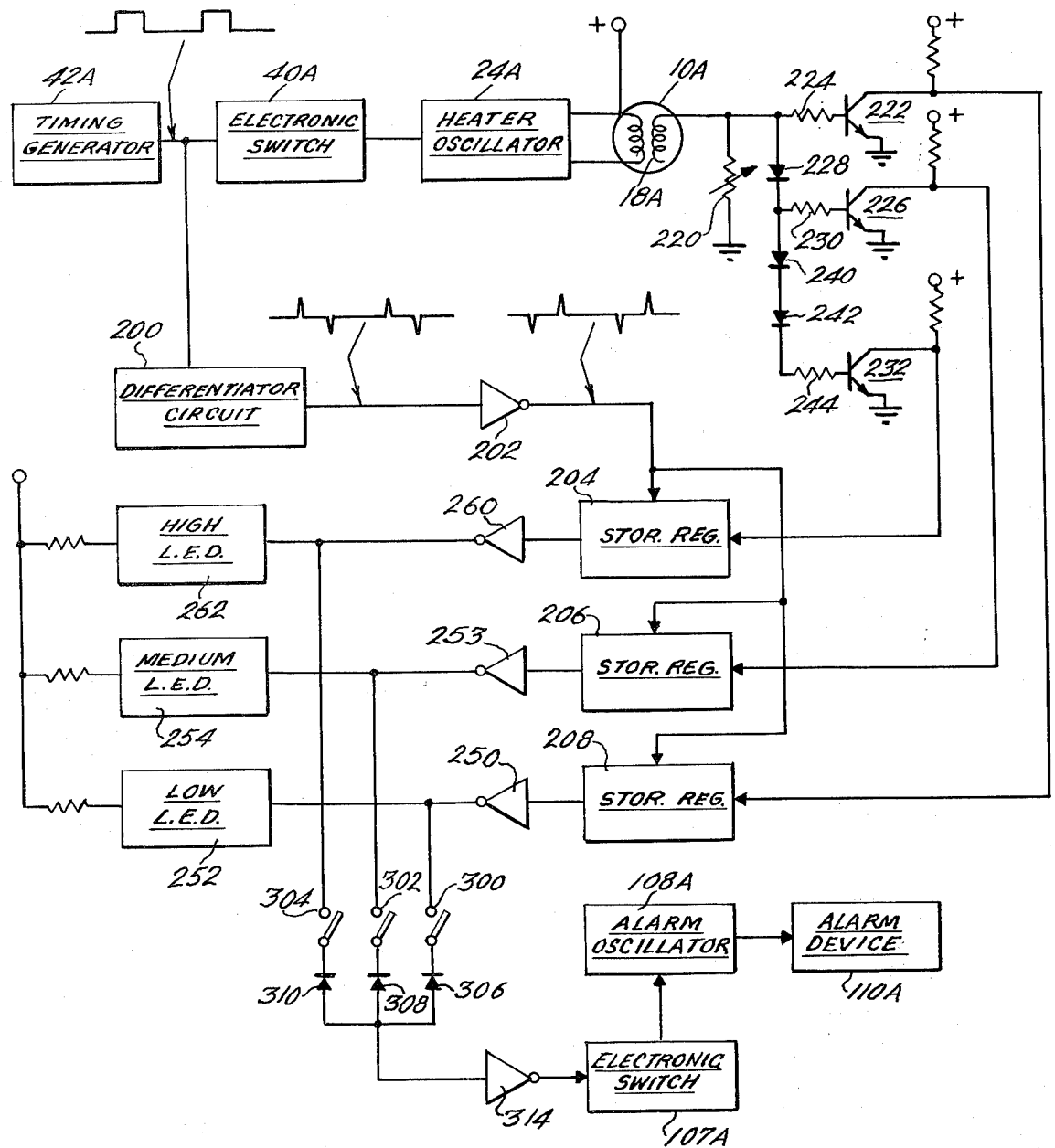
FIG. 5 is an electrical schematic diagram of another preferred embodiment of the invention.

Without thereby in any way limiting the generality of the invention, the following description of representative embodiments is given in the interest of definiteness. Referring first especially to FIGS. 1 and 4, in which corresponding parts are indicated by corresponding numerals, a gas sensor 10 is employed which may be of the above-mentioned Taguchi type employing a type IV oxide compound the resistance of which decreases when it absorbs reducing gases and the resistance of which increases when it absorbs oxygen. Controlled heating of the sensor is accomplished by a heater coil 12 embedded in the sensor material and to which an alternating voltage is applied, and the resistance of the sensor is measured by passing a current through it from a measuring current source 14 such as a battery 14A when the battery switch 15 is closed. To permit passage of the measuring current, another electrode 18 may be provided in the sensor material and connected in series with the current source. A resistance element, such as resistor 20, in series with the current source and the sensor electrodes will then produce a voltage proportional to the sensor current and hence inversely proportional to the resistance of the sensor.

FIG. 3 illustrates a typical response of such a sensor to two different classes of gases in contact therewith. In the latter figure, ordinates represent relative response of the sensor, or the sensor output signal in the form of current through the sensor or voltage across the resistor 20 in series with the sensor; abscissae represent the sensor temperature in degrees Centigrade. Curve A is for a typical relatively complex hydrocarbon gas, in this case propane gas, and Curve B is for carbon monoxide gas. It will be seen that in a lower temperature range, in this case from about 20° to 40° C, the sensor response or output signal for the typical more complex hydrocarbon is extremely low, while above about 60°C the response for such gases becomes high. Also, in the lower temperature range of about 20° to 40° C, the response for carbon monoxide is high and many times greater than the response for propane; in higher temperature regions above 60°, the carbon monoxide response is substantially lower than for propane. Also shown is a higher temperature range between about 200° and 320° C, operation within which will cause the sensor to purge itself and return to a reference high-resistance condition. While this purging is not necessarily complete if the contacting gas continues to be present, nevertheless a very substantial reduction in the amount of absorbed reducing gas is effected so as to reduce this amount well below the saturation level.

In this example the heater current for heating the sensor material is provided by a heater oscillator 24, which may comprise a pair of NPN transistors 26 and 28 having their emitters connected together, their collectors and bases cross-coupled by resistors 30 and 32, and their collectors interconnected by a transformer primary coil 36 the center tap of which is supplied with operating supply voltage from the battery 14A. The oscillations generated across coil 36 are transferred by the transformer to the secondary coil 39, which applies them across the sensor heater coil 12.

The heater oscillator 24 is controlledly turned on and off, in this case by means of an electronic switch 40 controlled by a timing generator 42. More particularly, in this example the timing generator comprises an NPN transistor 44 the collector of which is connected to the positive terminal of battery 14A, the emitter of which is connected directly to the emitter of PNP transistor 48, and the base of which is connected to its own collector by way of a resistor 50, the cathode of a diode 52, the anode of diode 52, and a resistor 54. The interconnection between resistor 50 and rectifier cathode 52 is connected by way of a capacitor 56 to the collector of transistor 48, and the base of translator 48 is connected to a tap point 58 between a pair of resistors 60 and 62 connected in series between the collector of translator 44 and the collector of transistor 48. The collector of transistor 48 is also connected through a resistor 66 and another resistor 68 to ground. The circuit just described serves to produce a rectangular waveform at the junction point 70 between resistors 66 and 68, which waveform is inverted and amplified by a transistor 72, whose emitter is directly grounded and whose collector is connected through resistor 74 to the battery 14A.

The output of the timing generator appearing at the collector of transistor 72 may have the waveform shown in FIG. 2A. In a typical apparatus, the more positive portions of the waveform may have a duration of about 20 seconds, and the intervening, more-negative portions a duration of about 40 seconds.

The output of the timing generator 42 is applied to the electronic switch 40, which may comprise a series resistor 80 connected to the base of an NPN transistor 82, the emitter of which is grounded and the collector of which is connected to, and constitutes the sole current path for, the emitters of the transistors 26 and 28 of the heater oscillator 24. Accordingly, when transistor 82 is turned on, it provides a low-resistance path to ground for the emitters of transistors 26 and 28 and enables heater oscillator 24 to operate. Such periods of operation of the heater oscillator occur during the more positive portions of the timing generator output signal shown in FIG. 2A. During the intervening times when the base of transistor 82 is more negative, the latter transistor will be turned off and the heater oscillator will not operate. The heater oscillator output supplied to transformer 38 will therefore be as generally represented in FIG. 2B, constituting bursts of oscillation occurring only during the positive pulses from the timing generator. It will be understood that there may be many more cycles of heater oscillator output for each timing generator pulse than are shown, a relatively small number of cycles being depicted merely in the interest of clarity.

Accordingly, it will be appreciated that heater oscillations are applied to the gas sensor only during the positive pulses from the timing generator and, as depicted in FIG. 2C, the temperature of the sensor increases to a predetermined saturation level during such intervals of heater oscillation, the sensor cooling to a low temperature between such heating times. In accordance with one aspect of the invention, the intensity and duration of the heating and the time between the heating of intervals are selected so that the temperature of the sensor rises to the higher temperature range denoted "purge operation" in FIG. 3 during the heating intervals, and falls into a lower temperature range denoted "sensing region" FIG. 3A in the latter half of the interval between successive heatings of the sensor.

As described previously, throughout these heating and cooling operations the battery 14A applies a voltage between the heater coil 12 and the other sensor electrode 18 so that the current through the sensor, and the voltage across resistor 20, very inversely with the resistance of the sensor. FIG. 2D illustrates the nature of the sensor output, the full-line curve for the case of lower, safe concentrations of CO or methane and the broken-line curve for the case of dangerously-high concentrations.

This output signal of the sensor is applied to the sampling circuit 88. More particularly, the signal across resistor 20 is applied to the series combination of a resistor 90 and the collector-to-emitter path of a transistor 92, which is of the NPN type and has its emitter grounded. When transistor 92 is turned on, its collector voltage will drop to near ground potential regardless of the value of the sensor output voltage, and when transistor 92 is turned off its collector voltage will follow the sensor output.

The times at which the sampling circuit 88 is operated are controlled from the timing generator 42 by way of the delay circuit 98. Thus the output of the collector of transistor 72 is supplied to the anode of a diode rectifier 99 the cathode of which is connected to ground by way of a delay capacitor 100. The voltage across the capacitor is supplied by way of a series resistor 102 to the base of transistor 92. The positive pulses from the timing generator as shown in FIG. 2A are thereby applied through diode rectifier 99 to the capacitor 100 to charge the capacitor positively, and between such pulses the voltage on the capacitor decays toward its original value as represented in FIG. 2E; in FIG. 2E, horizontal line L represents the base voltage level above which transistor 92 becomes strongly conductive. Accordingly, referring to FIG. 2E, the sampling transistor 92 remains conductive to eliminate the sensor outputs during the sensor heating times, and for a predetermined interval thereafter until the delay circuit output has fallen to the level L, as at the time $S_0$. The sampling transistor remains non-conductive until the beginning of the next timing generator output pulse occurs, at times such as $S_1$. Accordingly, only during the sampling interval S, occurring during the latter portion of the interval between heating pulses, is the sensor output passed on to the hold circuit 104.

FIG. 2F therefore represents the sampling circuit output, comprising samples of the sensor output signal produced during the later portions of the intervals between successive heating pulses, and therefore at times when the sensor has cooled into the sensing region, in this example about 20° to 40° C.

Hold circuit 104 responds to the sampled sensor output signal to hold the values thereof during the intervals between the samples, thereby to convert the sampled signal to a continuous signal. In this example this is accomplished by applying the output of the sampler circuit to the anode of a diode rectifier 105, the cathode of which is connected to ground through the capacitor 109, the signal across the capacitor then being supplied through series resistor 111 to the output of the hold circuit. This constitutes a standard type of peak detector circuit wherein the diode rectifier permits the capacitor 107 to charge up to substantially the full sampling signal level, and when the sampled signal disappears the rectifier is cut off so that the capacitor retains substantially at the voltage which it has achieved. The resultant output of the hold circuit is represented in FIG. 2G, comprising a continuous signal the level of which varies with the level of the sampled signal.

Referring again to FIGS. 2D, 2F and 2G, it will be understood that the curves shown in full line represent the case in which a relatively lower, safe level of carbon monoxide or methane is present at the sensor, and the broken line curves represent the case in which a substantially higher and dangerous amount of CO or methane is present. The higher amount of carbon monoxide or methane reduces the resistance of the sensor, causing the current through it, and the output voltage thereof, to be higher than otherwise during the intervals in which the sensor temperature is in the low temperature range, and the samples taken during the operation of the sensor in the low temperature range accordingly have a substantially higher amplitude when the larger, unsafe amount of carbon monoxide or methane is present. Similarly, the continuous output signals from the hold circuit have a higher level when the larger amounts of carbon monoxide or methane are present. In FIG. 2G, the horizontal broken line T between the two continuous-signal graphs illustrates a threshold level representing the danger level for concentration of carbon monoxide or methane. Thus the solid line curve in FIG. 2G represents a safe level of carbon monoxide or methane, and the broken-line curve lying above the threshold level represents a dangerous concentration.

The output of the hold circuit 104 is utilized in this example to operate an alarm device when this output exceeds the threshold level. In this example this is accomplished by amplifying the output of the hold circuit and utilizing it to turn on an alarm oscillator, which operates an alarm device. For this purpose, the output of the hold circuit 104 is supplied to an amplifier 106 which acts through an electronic switch 107 to turn on alarm oscillator 108 and operate alarm device 110 only when the hold circuit output exceeds the threshold level T.

More particularly, in the representative embodiment shown in FIG. 4 the amplifier 106 comprises an NPN transistor 114 having its collector connected to the positive supply, its base fed with the output of the hold circuit, and its emitter connected directly to the base of another NPN transistor 116. The emitter of transistor 116 is grounded, and its collector connected through a resistor 118 to the positive supply. The collector of the transistor 116 is also directly connected to the base of a PNP transistor 122, the collector of which is connected to ground through a resistor 124 and the emitter of which is connected to the positive supply source.

The more positive the input voltage to transistor 114 the more current it passes to the base of transistor 116, the greater the current through the collector of transistor 116, the more negative the voltage at the collector of transistor 116, the more current is produced in transistor 122, and the more positive is the voltage across resistor 124 and on the output line of amplifier 106. The output of amplifier 106 is applied to the electronic switch 107 to turn it on and off, and thus to turn on and off alarm oscillator 108.

More particularly, alarm oscillator 108 may comprise a multivibrator oscillator like the heater oscillator 24, and is turned on and off by an electronic switch in the form of a transistor 125. When the output voltage from the hold circuit 104 applied to the base of transistor 114 is sufficiently positive, transistor 125 becomes strongly conductive to ground the emitters of the two transistors of the oscillator and to permit alarm oscillations to take place. At other times, when transistor 125 is off, such oscillations do not occur.

It is noted that in the absence of signal from the sensor, transistors 114 and 116 will be off, the voltage of the base of transistor 122 will be substantially the same as the voltage at its emitter and this transistor will therefore also be off, and the voltage applied to the base of switching transistor 125 will be about ground potential, rendering it non-conductive and the alarm oscillator non-operative. However, when the signal from the sensor becomes sufficiently positive, so that the continuous voltage level at the output of the hold circuit 104 is sufficiently positive, transistors 114 and 116 will be rendered conductive, the voltage at the base of transistor 122 will become negative, and when it becomes sufficiently negative to produce a sufficiently positive voltage at the base of transistor 125, the latter transistor will be turned on to render the alarm oscillator operative. For given transistor types, the values of resistors 118 and 124 can be selected to provide the desired threshold level which must be exceeded by the output of the signal sensor before the switching transistor 125 is turned on to operate the alarm oscillator, this threshold being selected to correspond to what is considered the safe level of carbon monoxide and/or methane in the particular use being made of the apparatus.

The alarm device 110 in this example comprises a small permanent-magnet loudspeaker 150, the voice coil of which is connected in series with a manually-operable speaker switch 152, with a manually-variable loudness-control resistor 154, and with the secondary 156 of transformer 158, the primary 160 of which supplies the alarm oscillator output to the alarm device. When the alarm oscillator operates, an audible alarm will be given off by loudspeaker 150 so long as switch 152 is closed. Once the alarm has been sounded, the switch 152 may be opened to avoid the annoyance of the continuing sound of the alarm. The resistor 154 may also be adjusted to produce the loudness of the alarm desired in a given application.

In the operation of the apparatus, the battery power switch 15 and the speaker switch 152 are closed, and the apparatus positioned so that the gas sensor 10 will be contacted by the atmosphere containing the gases to be detected. The apparatus will then operate automatically to sense the level of carbon monoxide and/or methane in the atmosphere with the sensor operating in the lower temperature range of about 20° to 40° C, and to purge the sensor by high-temperature operation in intervals between successive sensings. If the concentration of carbon monoxide and/or methane is low enough to be at a safe level, no alarm will be sounded; however, if the concentration rises above a safe level, an audible alarm will be sounded to indicate this fact. It will be understood that the durations of the sensor output samplings are sufficiently short that the sensor does not become saturated, at least for safe concentrations of CO and/or methane.

Preferably also included in the apparatus is a normally open test switch 190, connected between the base of the sampling transistor 92 and ground. When the switch is in its normal, open position, it has no effect on the above-described operation. When switch 190 is manually closed, it grounds the base of transistor 92 to render the latter transistor non-conductive and to permit the sensor output signal to be passed to the hold circuit without interruption or sampling. It will be understood that in the present embodiment the voltage applied between the sensor electrodes is not only the direct voltage from the battery, but also the alternating heater voltage, which causes the total voltage across the sensor to vary up and down on either side of the DC voltage supplied thereto from battery 14. For clarity the variation in sensor output caused by the heater voltage has not been shown in FIG. 2D, since in any event the sampling operation prevents this output from affecting the alarm under conditions of normal operation. However, when test switch 190 is closed the sampling is discontinued, and the variations due to the heater voltage appearing at the output of the sensor are rectified by rectifier 105 to produce a continuous DC level sufficient to turn on the alarm oscillator and operate the alarm. Thus, if closing of the switch 190 produces an alarm, this constitutes a test showing that all of the circuit (except the delay circuit portion) is operating.

If desired, a "purge" switch may also be included, comprising a normally-open manually-operable single-pole single-throw switch for simultaneously grounding the collector of transistor 82 and the anode of diode 99, so that the heater oscillator will then run continuously to fully purge the sensor in the event that unusually thorough and complete purging is desired at a given time.

By way of example only, in the embodiment of FIG. 4 the heater oscillator may operate at about 1,000 kilo Hertz and the alarm oscillator at about 1,000 Hertz. The heater voltage applied to the heater coil by the heater oscillator may be about 1.25 to about 1.50 volts average. The positive supply voltage may be about 12 volts.

Referring to the embodiment shown in FIG. 5, parts thereof corresponding to those in FIG. 1 are indicated by corresponding numerals with the suffix A. Thus timing generator 42A, electronic switch 40A, heater oscillator 24A, gas sensor 10A, electronic switch 107A, alarm oscillator 108A and alarm device 110A may be as shown and described with respect to FIGS. 1–4. The principal difference between the two embodiments lies in the circuitry between the output of the gas sensor and the input to the electronic switch 107A which operates the alarm.

More particularly, in the FIG. 5 embodiment the output of the timing generator 42A comprising positive, generally-rectangular pulses defining times during which the heater oscillator operates, are passed through a differentiator circuit 200 which produces at its output corresponding very narrow pulses occurring at the times of the leading and trailing edges of these pulses. These differentiated pulses are passed through an inverter 202, so that the output of inverter 202 comprises positive pulses corresponding to the times of occurrence of the trailing edges of the timing generator pulses, and hence occur at the time when the heater oscillations terminate. These inverted differentiated pulses are applied to control inputs of each of three storage resistors 204, 206 and 208, which may be of conventional form such that the above-mentioned positive differentiated pulses effectively clear the registers of previous information and reset them in preparation for receiving subsequent information. Such devices and operations being well known in the art, they need not be shown and described in detail herein.

The sensor electrode 18A is connected to ground through the variable resistor 220, the voltage across which resistor is supplied to the base of an NPN transistor 222 by way of a resistor 224; to the base of another NPN transistor 226 by way of a forwardly biased diode 228 and a resistor 230; and to the base of still another NPN transistor 232, by way of the series combination of the above-mentioned forward-biased diode 228 and the further combination series of two additional forward-biased diodes 240 and 242 and a further series resistor 244.

Each of the three similar transistors 222, 226, and 232 has its emitter grounded and its collector connected through a corresponding collector load resistor to a common source of positive supply voltage. The signal at the collector of transistor 222 is supplied to the input of storage register 208, the signal at the collector of transistor 226 is supplied to the input of storage resistor 206, and the signal at the collector of transistor 232 is supplied to the input of storage register 204.

Each of the transistors 222, 226 and 232 is of a type which requires some small but definite positive voltage to cause it to be turned on. Accordingly, a first level of voltage must be developed across variable resistor 220 before transistor 222 will be turned on; transistor 226 will not be turned on until the voltage across resistor 220 reaches a second, higher level corresponding to the sum of the voltage drop in the diode 228 and the voltage required to turn on transistor 226. Similarly, transistor 232 will not be turned on until the voltage across resistor 220 reaches a third, still higher, level equal to the sum of the voltage drops in the three diodes 228, 240, 242 plus the voltage necessary to turn on transistors 232.

As an example only, the circuit may be adjusted so that transistor 222 is first turned on when the concentration of CO is about 35 parts per million; transistor 226 may turn on for about 70 parts CO per million; and transistor 232 may turn on for a concentration of about 140 parts per million of CO.

Following the occurrence of the trailing edge of each timing generator pulse, the three storage resistors 204, 206, and 208 will be prepared to receive and store indications that the level of sensor signal required to turn on its corresponding transistor has been achieved. Thus if transistors 222 is turned on, indicating that the sensor output has reached level 1, storage register 208 will act through inverter 250 to turn on light-emitting diode 252. Similarly, if the sensor output reaches the second level, storage register 206 will be actuated and will operate through its corresponding inverter 252 to turn on light-emitting diode 254; when the sensor output reaches level 3, transistor 232 actuates storage resistor 204, which in turn operates through inverter 260 to turn on light-emitting diode 262. The illumination of one, two, or all three of the light-emitting diodes therefrom provides an indication of whether there has been detected a minimum detectable level of CO, twice this level, or four times this level.

The outputs of the three inverters 250, 253, and 260 are also supplied respectively through manually-operable single-pole and single-throw switches 300, 302, and 304 respectively, and through corresponding respective diodes 306, 308 and 310, to an OR circuit comprising amplifier 314. The arrangement is such that an output from any one of the three storage registers, acting through its corresponding one of the set of three switches, is sufficient to operate amplifier 314 and produce an output for sounding the alarm. If all these switches are open, no alarm is produced under any circumstance. Any time at which switch 300 is closed, there will be an audible alarm given whenever the sensor output exceeds its first level; whenever switch 302 is closed and switch 300 is open, such an alarm will only be given when the sensor output exceeds the second level; any time switch 304 is closed and both of the switches 300 and 302 are open, an alarm will be given only when the sensor output exceeds the third level.

It is particularly noted that the period following the trailing edge of the timing generator pulse for which the storage registers are sensitive is that period following each heating cycle when the temperature of the sensor is decreasing and, of CO or other gas to be detected is present, the sensor output is increasing through one or more of the above-mentioned three levels, if the concentration of the CO is sufficient. Also, the use of the three levels, the three LED's and the three switch arrangements for controlling the alarm provides a greater versatility of the system, not only in enabling it to be set for different levels with which the user may be concerned, but also so that he may see levels less than, but approaching a dangerous level, as a warning; also, when the levels are set sufficiently low so that the lowest level is in the area where the measurement provided by the equipment is not entirely reliable, the lower level may be used as an indicator of possible presence of adverse gases, and the higher levels used as definite indications thereof.

While the invention has been described in the interest of definiteness with particular reference to specific embodiments thereof, it will be understood that it may be embodied in a larger variety of forms diverse from those specifically shown and described, without departing from the spirit and scope of the invention as defined by the appended claims.

What is claimed is:

1. The method of operating a gas sensor of the type which exhibits substantial response to contact adsorption by a given class of gases when the temperature of the sensor is in a lower range and which purges itself of said adsorbed gases when operated in a temperature range higher than said lower range, comprising the steps of operating said sensor alternately and repetitively in said lower temperature range to sense said gases and in said higher temperature range to purge said sensor, sampling the response of said sensor selectively for predetermined intervals of time during said operations in said lower temperature range, and deriving indications of said response produced during said samplings.

2. A method according to claim 1 wherein the response is a modification of the sensor's conductivity and indication of the response is derived by sensing the change in current through the sensor by monitoring the voltage across a resistor and by activating a signal circuit when the voltage exceeds a given level.

3. A method according to claim 2 wherein separate signal circuits are activated when the voltage exceeds different levels.

4. Apparatus for sensing gases, comprising:
a gas sensor of the class which is modified conductively by contact with a given first class of gases when operated in a lower temperature range and which purges itself of said gases and restores itself toward original conductivity when operated in a temperature range higher than said lower temperature range;
means for operating said sensor alternately and repetitively in said lower temperature range to sense said gases and in said higher purging temperature range to purge said sensor; and
means for selectively measuring and indicating said conductive response of said sensor occurring when it is operated in said lower temperature range.

5. Apparatus according to claim 4 wherein said measuring and indicating means comprises means causing current flow through said sensor, means measuring said flow and a plurality of signal circuits respectively activated at different levels of current flow measured through said sensor.

6. The apparatus of claim 4, wherein said first class of gases comprises CO and methane, said sensor responds many times more strongly in said lower temperature range to said first class of gases than to a second class of gases comprising more complex hydrocarbons, and said sensor responds many times more strongly to said second class of gases than to said first class of gases in a third temperature range higher than said lower temperature range but lower than said purging temperature range.

7. The apparatus of claim 6, in which said response comprises a change in electrical resistance of said sensor.

8. The apparatus of claim 6, in which said means for selectively measuring and indicating said response comprises means for passing a current through said sensor to provide a signal which is a measure of the resistance thereof, means for sampling said signal during intervals of predetermined duration when said sensor is in said lower temperature range, and means responsive to said sampled signal for determining when said sampled signal reaches a predetermined threshold level.

9. The apparatus of claim 8, in which said last-named means comprises hold-circuit means responsive to said sampled signal for producing a continuous signal varying with the amplitude of said sampled signal and indicator means responsive to said continuous signal for producing indications of when said continuous signal reaches a predetermined level.

10. The apparatus of claim 9, in which said means for passing a current through said sensor comprises a pair of spaced electrodes in contact with said sensor and means for applying a direct voltage between said electrodes, and in which said means for operating said sensor alternately in said higher and lower temperature ranges comprises means for applying an alternating signal to one of said electrodes, said apparatus also comprising test means manually-operable to disable said sampling means to cause application of said signal to said indicator means without sampling thereof.

11. Apparatus for automatically producing an alarm when the concentration of CO in the air exceeds a predetermined level, comprising:
a gas sensor device responsive to contact by air containing CO to reduce its electrical resistance substantially when operated in a lower temperature range, said gas sensor tending to exhibit progressively increasing response as the period of its exposure to CO increases, said gas sensor being purgable of CO by operating it at a temperature in a range higher than said lower temperature range;
timing generator means for producing a periodic timing signal;
a heater oscillator and heating means associated with said sensor for heating said sensor into said higher temperature range when said oscillator is operating;
means responsive to said periodic timing signal for rendering said heater oscillator alternately operating said non-operating, thereby alternately to heat said sensor into said higher temperature range and to cool it into said lower temperature range;
means for passing a current through said sensor to develop a signal which varies with changes in electrical resistance of said sensor;
sampling means responsive to said timing signal for interrupting said signal except during sampling intervals of predetermined duration during which said sensor is operating in said lower temperature range;
hold circuit means responsive to said output signal from said sampling means for producing a continuous signal varying with the amplitude of said sampled signal;
electrically-operable alarm means; and
threshold circuit means responsive to said continuous signal for operating said alarm means when said continuous signal reaches a predetermined level.

12. The apparatus of claim 11, wherein said means for passing a current through said sensor comprises a pair of spaced electrodes in contact with said sensor and means for applying a direct voltage between said electrodes, said apparatus also comprising test switch means manually operable to discontinue said interrupting of said signal for testing the operation of said apparatus.

13. The apparatus of claim 11, in which said sensor is many times more responsive to CO when in said lower temperature range than when in said higher temperature range.

* * * * *

UNITED STATES PATENT OFFICE
CERTIFICATE OF CORRECTION

Patent No. 3,906,473  Dated September 16, 1975

Inventor(s) Harris D. LeVine

It is certified that error appears in the above-identified patent and that said Letters Patent are hereby corrected as shown below:

Col. 4, line 21, "translator" should be --transistor--;
Col. 4, line 24, "translator" should be --transistor--;
Col. 5, line 15, "very" should be --vary--;
Col. 9, line 7, "resistors" should be --registers--;
Col. 9, lines 31,32, "re-sistor" should be --re-gisters--;
Col. 9, line 64, "252" should be --253--;
Col. 9, line 66, "resistor" should be --register--;
Col. 10, lines 2,3, "there-from" should be --there-fore--;
Col. 10, line 15, "these" should be --three--;
Claim 11, line 41, after "said" insert --sampled--.

Signed and Sealed this ninth Day of December 1975

[SEAL]

Attest:

RUTH C. MASON
*Attesting Officer*

C. MARSHALL DANN
*Commissioner of Patents and Trademarks*